United States Patent [19]

Dunn

[11] Patent Number: 4,983,960

[45] Date of Patent: Jan. 8, 1991

[54] PORCH OR ENTRY SWITCH PROVIDING EMERGENCY SIGNALS

[76] Inventor: Richard P. Dunn, 4701 Sisk Rd., Wichita Falls, Tex. 76310

[21] Appl. No.: 322,281

[22] Filed: Mar. 13, 1989

[51] Int. Cl.[5] .......................... H04B 1/00; H01H 9/00; G08B 5/00

[52] U.S. Cl. .............................. 340/825.170; 340/331; 340/332; 200/6 BB; 200/283

[58] Field of Search ................................ 340/330–332, 340/825.17; 200/6 BB, 6 C, 283, 310, 315; 307/115

[56] References Cited

U.S. PATENT DOCUMENTS

| | | | |
|---|---|---|---|
| 4,276,542 | 6/1981 | Ross | 340/331 |
| 4,556,863 | 12/1985 | Devitt et al. | 340/331 |
| 4,739,187 | 4/1988 | Nelson et al. | 340/331 |

*Primary Examiner*—Donald J. Yusko
*Assistant Examiner*—Dervis Magistre
*Attorney, Agent, or Firm*—Head and Johnson

[57] ABSTRACT

A switch for controllng a porch light for providing an emergency signal, the switch being formed of a body of non-conducting material having a flasher and toggle pivotally supported to the switch body, the toggle being positionable in an OFF position whereby no continuity is provided through the switch, in an ON position wherein continuity is provided, and a FLASHER position wherein continuity is provided through the flasher, the switch being connectable in series between a voltage source and a light so that in the first position the light is ON, in the second position the light is OFF and in the third position the light is connected to the voltage source through the flasher.

1 Claim, 5 Drawing Sheets

52
48
50
20
32
22
28
34
38
30
26

16
34
20
48
46
44A
52
44
5
40
42
7
54
56
22
62
60
32
38
6
34
26
36
18
34A
30
50
28
14

44A
44
46
42
34
40
20
48
52

PORCH OR ENTRY SWITCH PROVIDING EMERGENCY SIGNALS

SUMMARY OF THE INVENTION

The invention disclosed herein is a switch designed to control a porch light or the like. Virtually every home or apartment has a porch or entry way light which, when the light is energized, casts light exteriorly of the home or apartment. Such porch or entry way lights are customarily turned ON only when the use of the porch or the entry is anticipated, such as when the occupant expects a guest. Therefore, the typical home or apartment has a switch adjacent the entry door to control the porch or entry way light.

The present invention provides a type of switch which can be substituted directly in place of the typical ON and OFF switch for controlling a porch light and which will provide an important emergency warning system. The switch of this disclosure has a toggle with three positions. In the first position the switch is OFF, that is, provides no continuity therethrough so that when the switch is connected in series with a light bulb and the toggle is in the OFF position, the bulb is not energized. The toggle has a second or ON position which provides continuity through the switch so that when the switch is in series between a voltage source and a light and the toggle is in the ON position, the light is continuously illuminated. The switch is different than the ordinary ON and OFF switch, however, in that the toggle has a third position. When in the third position, a flasher element which is integral with the switch, is connected in series between the voltage source and the light to which the switch is connected so that when the toggle is in the third position, the light, such as the porch or entry way light, is flashed.

The importance of this arrangement can be easily illustrated by an example. For instance, in the normal use of a porch or entry light, it is left OFF to conserve electricity. When a home owner expects a guest, needs light on the porch or entry way or for any other purpose, the home owner moves the switch toggle to the ON position, which turns ON the porch or entry way light. Thus, for the ON and OFF positions, the light switch acts exactly in the way of the usual switch controlling a porch light. However, the third position of the light switch provides an unique and important function. In the third position, the porch or entry way light is flashed, that is, rapidly turned ON and OFF by the self contained flasher within the switch. This serves as a visual warning to those exteriorly of the house or apartment. As an example, if a fire occurs and the occupant of the home or apartment calls the fire department, he can immediately then go to the porch or entry switch and turn it to the third position. The porch or entry way light then will be continuously flashed ON and OFF. When the firemen answer the alarm and enter the street or neighborhood where the home or apartment is located, the flashing porch or entry way light will immediately call attention to the location of the emergency. This saves time of the firemen seeking the specific home or apartment having the emergency condition.

Obviously, the same benefit is achieved when the police or when an ambulance is called. If the occupant of the house or apartment having the switch of this invention controlling the porch or entry way light, finds himself in an emergency situation and even though no telephone call or other effort to secure help has been initiated, the occupant can turn the switch to the FLASHER position which will signal to neighbors that an emergency condition exists. Therefore, a person who is mentally or physically debilitated so as to be unable to dial a telephone can, at least, provide an emergency message by turning the switch to the FLASHER position.

A better understanding of the invention will be had to reference to the following description and claims, taken in conjunction with the attached drawings.

DESCRIPTION OF THE VIEWS

FIGS. 2, 5, 6 and 7 are all shown without the toggle plate.

FIG. 10 shows the position of the toggle in dotted outline when the switch is in the FLASHER position as in FIG. 16.

DESCRIPTION OF THE PREFERRED EMBODIMENT

Figure 1:
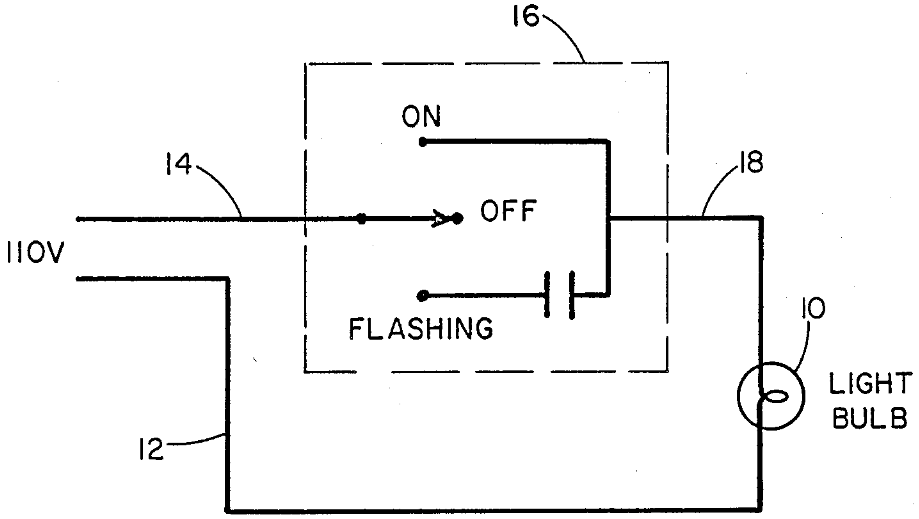
FIG. 1 is an electrical diagram showing the use of the switch of this invention in an electrical circuit providing a switch function between a voltage source and a light, such as a porch or entry way light.

FIG. 1 is a diagram showing the function of the switch which is the subject of this disclosure. Bulb 10 is emblematic of a porch light, entry way light, or any other light positioned wherein it is normally turned ON or OFF, but which, by the use of the switch of this invention, can be operated in a way to provide a warning signal. Bulb 10 is supplied by means of a ground conductor 12 and a voltage conductor 14 extending from a voltage source. The switch of this invention is generally indicated by the numeral 16 contained in the dotted box. From the switch 16, a supply conductor 18 carries voltage to the bulb 10 when the switch 16 provides continuity. The switch 16 diagrammatically illustrated is not related to the structural arrangement of the switch, but illustrates only the switch 16 as a three positioned switch with an OFF position, as shown in FIG. 1, with an ON position and with a FLASHER position.

Figure 2:
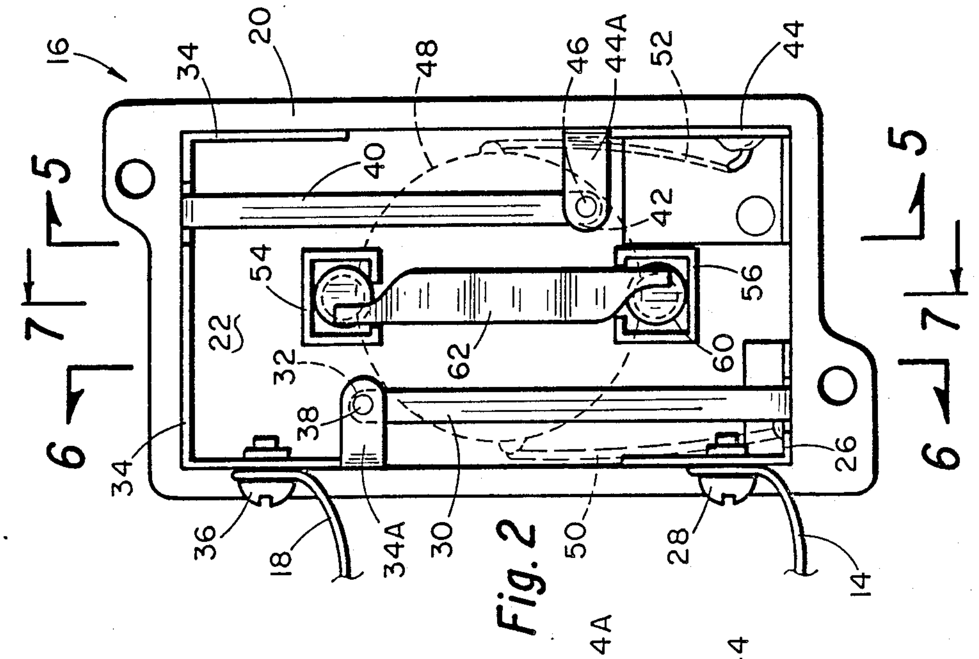
FIG. 2 is a top view of the switch body, the switch body being shown as having a cavity therein with an open top.
Figure 3:
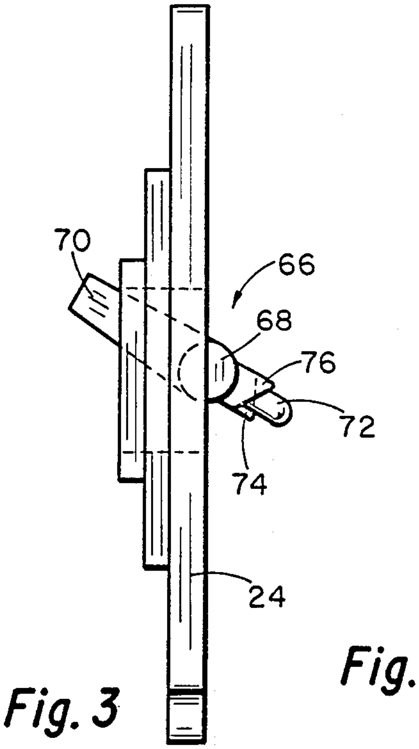
FIG. 3 shows a side view of a toggle plate used with the switch body of FIG. 2.
Figure 4:
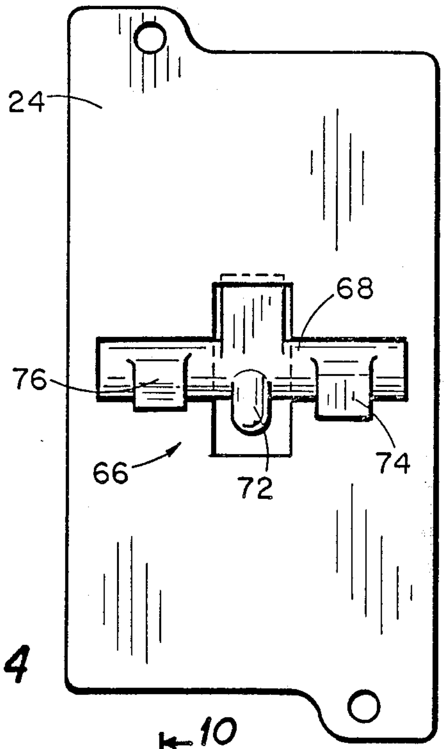
FIG. 4 is a rearward elevational view of the toggle plate of FIG. 3, showing the integral post portions of the toggle which is pivotally mounted relative to the cover plate.

Switch 16 is illustrated in FIGS. 2-18. Referring first to FIG. 2, switch 16 is formed of a housing 20 of non-conducting material, such as plastic which has a cavity 22 therein providing an open top. The open top is closed by toggle plate 24, as shown in FIGS. 3 and 4. Positioned within the housing cavity 22 and secured to housing 20 is a first fixed contact 26 which has a portion exposed to the exterior of the housing and having a screw 28 therein so that the first fixed contact is adapted to receive the end of voltage conductor 14. The first fixed contact 26 also has extending from it a first leaf spring 30. The first leaf spring has, at the outer end thereof, a contact 32 (see also FIG. 6).

Received within cavity 22 of the housing is a second fixed contact 34. The second fixed contact also has a portion exposed to the exterior of the housing 20 having a screw 36 therein by which one end of supply conductor 18 is attached. In addition, the second fixed contact 34 has a portion supporting a contact point 38 (see also FIG. 6) which, when the first leaf spring 30 is in the non-deflected position, it is engaged by spring contact 32.

Figure 5:
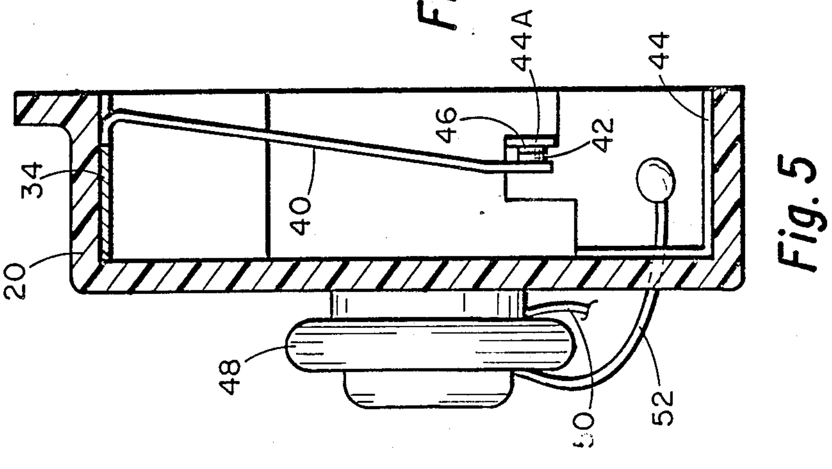
FIG. 5 is a cross-sectional view taken along the line 5—5 of FIG. 2, showing one portion of the switch.

Second fixed contact 34 also has a second leaf spring 40 extending from it. Spring 40 extending generally parallel to and spaced apart from leaf spring 30. Second leaf spring 40 has, on the outer end thereof, as best seen in FIG. 5, a contact point 42.

A third fixed contact 44 is secured to the housing within cavity 20 and has a portion 44A which supports a contact point 46. (See also FIG. 5). The contact 42 on the outer end of second leaf spring engages contact 46 when second leaf spring 40 is in its non-deflected position.

Figure 6:
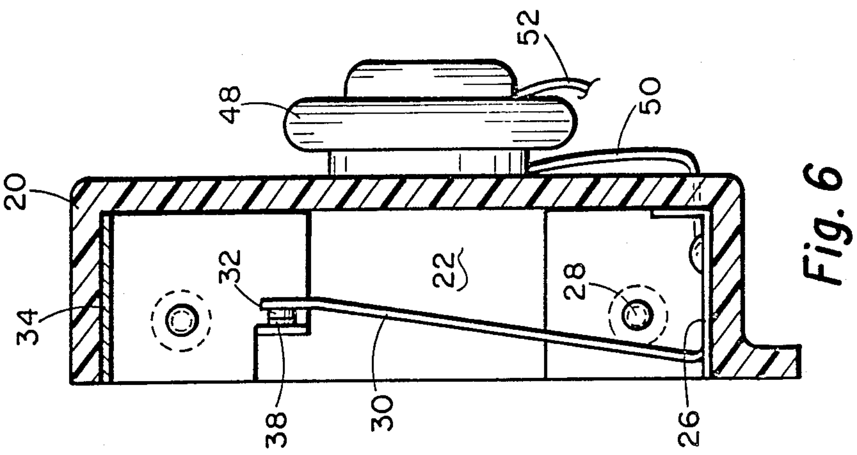
FIG. 6 is a cross-sectional view taken along the line of 6—6 of FIG. 2, showing the opposite portion of the switch.

Secured to the housing 20 is a flasher element 48 which is designed so that when subjected to a voltage, it will automatically open and close, staying closed for a preselected time and open for a preselected time in continuous alternate cycles. The flasher element 48 may be positioned either within the interior cavity 22 or exteriorly of it. The illustrated embodiment is with the flasher 48 affixed to the exterior surface of housing 30. The flasher element 48 has a first conductor 50 extending from it which is connected, as shown in FIGS. 2 and 6, to the first fixed contact 26. The flasher element 48 has a second conductor 52 which is connected to the third fixed contact 44, as shown in FIGS. 2 and 5.

Figure 7:
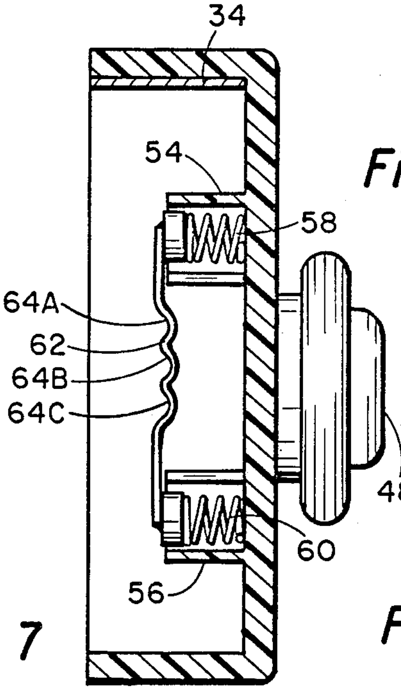
FIG. 7 is a cross-sectional view taken along the line of 7—7 of FIG. 2, showing the toggle position retention member.

Integrally formed with the housing 20 and centrally within the cavity 22 is a first spring well 54 and a second spring well 56 (See FIGS. 2 and 7). Received within wells 54 and 56 are springs 58 and 60 respectively. As best shown in FIGS. 2 and 7, extending between the springs 58 and 60 is a position retention bar 62 which is undulated in configuration having three indentions 64A, 64B and 64C therein. The positioning retention bar 62 is positioned parallel to and between first and second leaf springs 30 and 40.

Referring again to FIGS. 3 and 4, the toggle plate will be described in greater detail. The toggle plate 24 mounts on the switch body 20 and covers cavity 22 and is held in place by means of screws (not shown). The toggle plate 24 carries a toggle member generally indicated by the numeral 66. The toggle has a cylindrical portion 68 which is supported within the toggle plate 24 and by which the toggle members 66 is rotatably supported relative to the toggle plate, and, thereby, relative to the switch. Integrally extending from the cylindrical portion 68 is a toggle handle portion 70 by which the operator controls the switch. Extending in the opposite direction from the handle portion 70, and integral to the cylindrical portion 68, are three integrally formed portions, the first being in the middle and in line with handle portion 70 and is a positioning portion 72. To either side of the positioning portion 72 and extending integrally from the cylindrical portion 68 is a first actuator position 74 and a second actuator portion 76. The positioning portion 72, when the cover plate 24 is secured to switch body 22, engages the position retention bar 62 and the positioning portion 72 will always be in one of the three indentions 64A, 64B, 64C. The first actuator portion 74 controls the position of first leaf spring 30 and the second actuator portion 76 controls the position of second leaf spring 40.

OPERATION OF THE SWITCH

Figure 8:
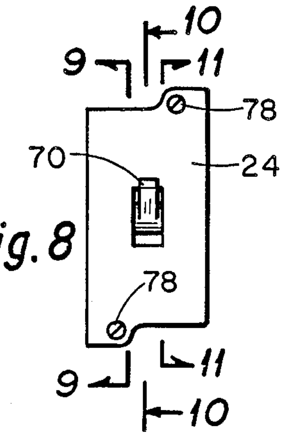
FIG. 8 is a reduced scale front view of the switch with the toggle plate thereon and showing the toggle in the first or ON position.
Figure 12:
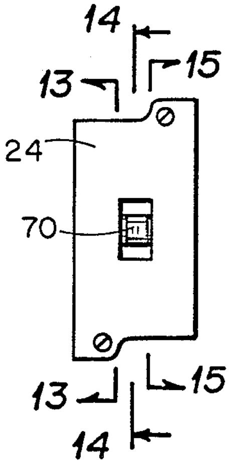
FIG. 12 is a front view of the switch with the toggle in the second or OFF position.
Figure 16:
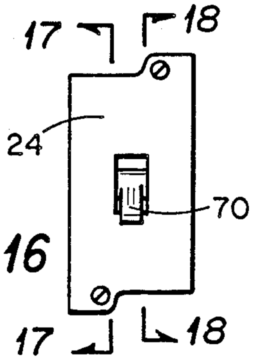
FIG. 16 is a reduced scale front view of the switch with the toggle in the third or FLASHER position.
Figure 14:
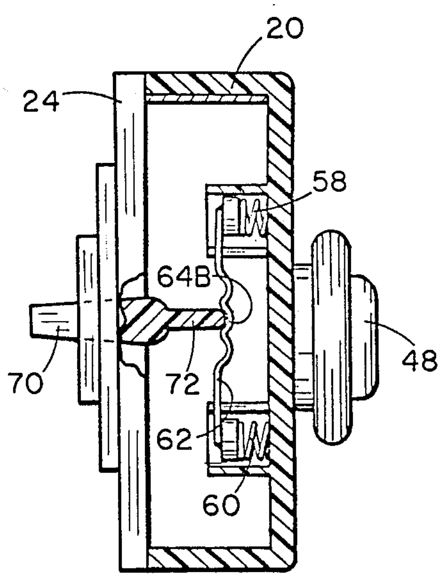
FIG. 14 is a cross-sectional view taken along the line 14—14 of FIG. 12, showing the middle of the switch and showing the toggle in the center or OFF position.
Figure 13:
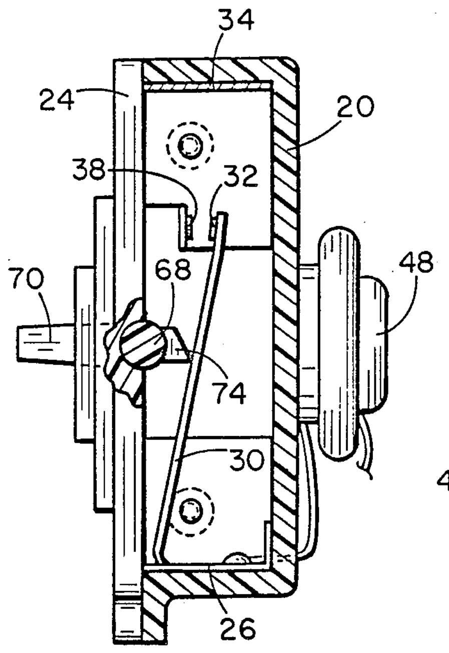
FIG. 13 is a cross-sectional view taken along the line 13—13 of FIG. 12, showing the first portion of the switch in the OFF position.
Figure 15:
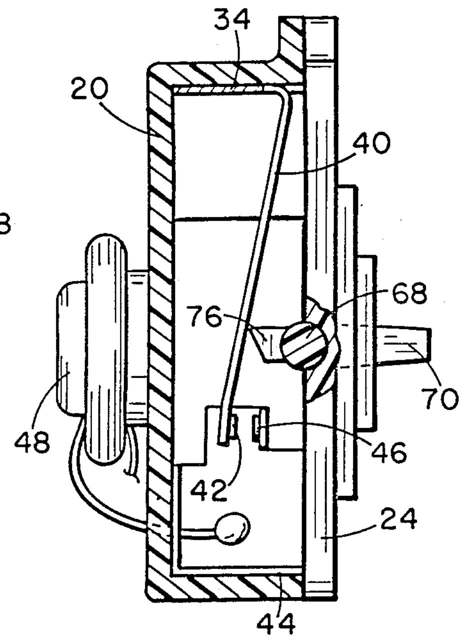
FIG. 15 is a cross-sectional view taken along the line 15—15 of FIG. 12, showing the other portion of the switch when the toggle is in the OFF position.

The operation of the switch is illustrated in FIGS. 8-18. FIGS. 8, 12, and 16 show the toggle plate 24 secured to the switch housing by means of screws 78. FIG. 8 shows the toggle handle 70 in the up or ON position; FIG. 12 shows the toggle handle 70 in the middle or switch OFF position; and FIG. 16 shows the handle 70 in the toggle down or FLASHER position. Cross-sectional views, FIGS. 8, 12 and 16, show the means whereby the toggle member 66 controls the displacement of leaf springs 30 and 40 to control the switch in the manner desired so that it has three modes, that is, a center or OFF mode, an up or ON mode, and a down or FLASHER mode. Referring first to FIG. 12, which is the switch OFF position. The internal arrangement of the switch when in the OFF position is shown in FIGS. 13, 14 and 15. FIG. 14 shows that in the center or OFF position of the toggle handle 70, the positioning portion 72 is received in the center indention 64B of the position retention bar 62. The depression of the springs 58 and 60 by the position retention bar 62 will retain the switch in the selected position until moved by the user to another position.

FIGS. 13 and 15 show that in the center position the toggle first actuator 74 engages the first leaf spring 30 and deflects it so that the contacts 32 and 38 are separated. This means that the continuity between conductor 14 is broken with conductor 34. At the same time, as shown in FIG. 15, the second actuator portion 76 of the toggle member depresses second leaf spring 40, separating contacts 42 and 46 so that continuity between second fixed contact 34 and third fixed contact 44 is broken. Therefore, there is no path within the switch for current flow from line conductor 14 to supply conductor 18 and the light bulb 10 of the circuit of FIG. 1 is unenergized or OFF.

Figure 9:
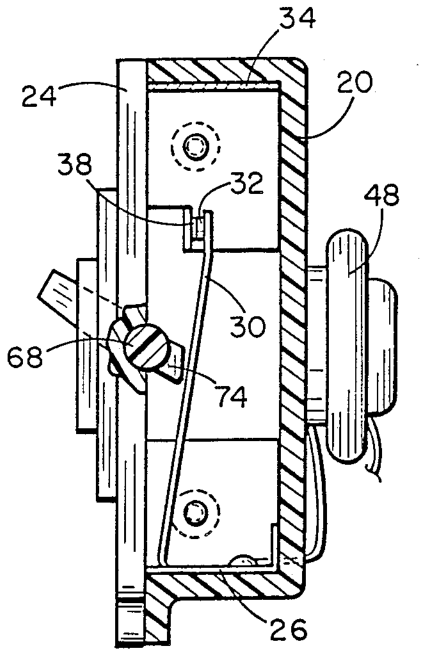
FIG. 9 is a cross-sectional view of the switch with the toggle plate thereon taken along the line 9—9 of FIG. 8.
Figure 11:
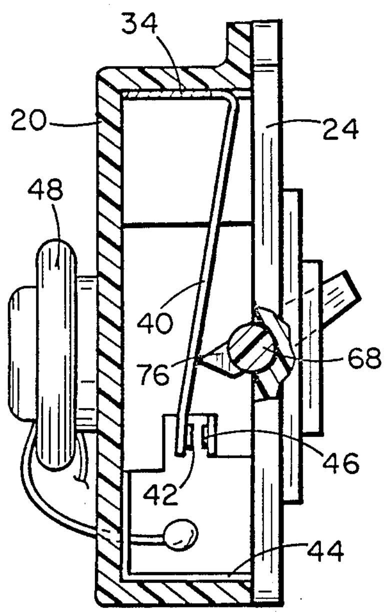
FIG. 11 is a cross-sectional taken along the line 11—11 of FIG. 8.
Figure 10:
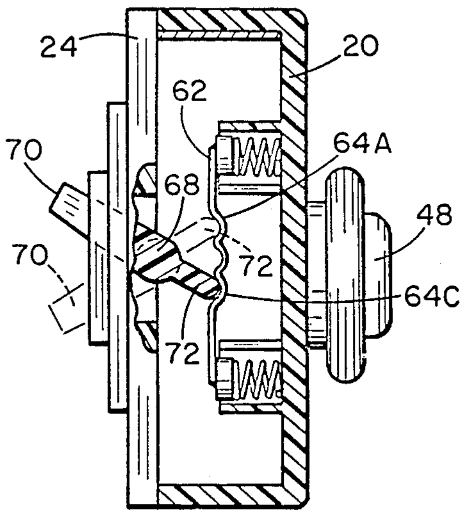
FIG. 10 is a cross-sectional view taken along the line 10—10, of FIG. 8, through the middle of the switch, showing the toggle position when in the ON position.

If the switch toggle handle 70 is moved to the upper position as shown in FIG. 8, and in cross-sectional views 9, 10 and 11, the switch is in the ON position. FIG. 10 shows the positioning portion 72 of the toggle member within indention 64C of the position retention bar 62. FIG. 9 shows that the first actuator portion 74 of the toggle is out of contact with leaf spring 30, allowing contacts 38 and 32 to close. This provides continuity between first fixed contact 26 and second fixed contact 34 which provides continuity between voltage conductor 14 and supply conductor 18, turning the light ON. At the same time, as shown in FIG. 15, the second actuator portion 76 has the second leaf spring 40 depressed, separating contacts 42 and 46 so that no voltage is applied to the third fixed contact 44 and, therefore, the flasher element 48 is out of circuit.

Figure 17:
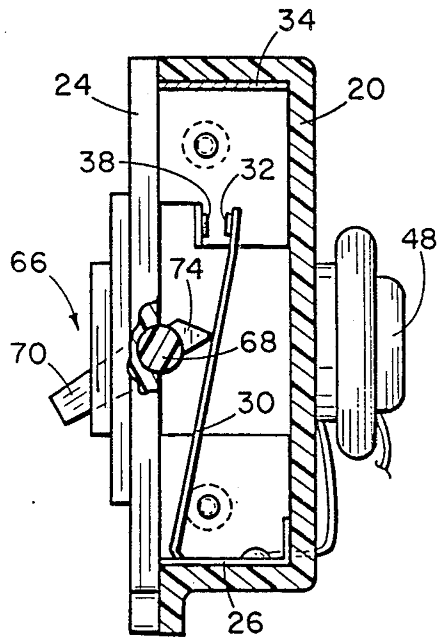
FIG. 17 is a cross-sectional view taken along the line 17—17 of FIG. 16, showing the first portion of the switch when the toggle is in the third or FLASHER position.
Figure 18:
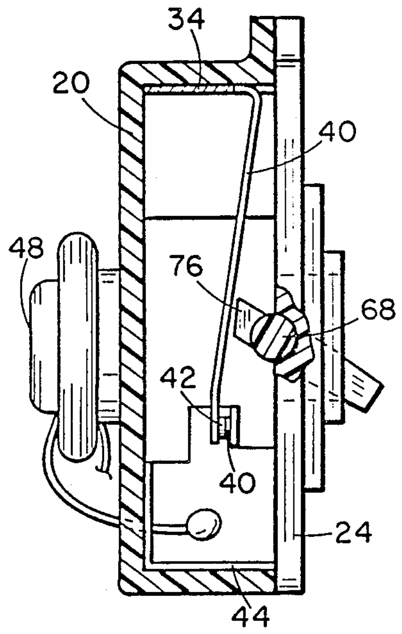
FIG. 18 is a cross-sectional view taken along the line of 18—18 of FIG. 16, showing the other portion of the switch when in the FLASHER or third position.

The third or FLASHER position is illustrated in FIG. 16, in which the switch handle 70 is in the down or FLASHER position and the internal arrangement of the switch is shown in FIGS. 17 and 18. In this arrangement, as shown in FIG. 17, the first actuator portion 74 of the toggle depresses the first spring 30 breaking electrical contact between the first fixed contact 26 and second fixed contact 34, therefore, the direct connection between conductors 14 and 18 is broken. However, as shown in FIG. 18, the toggle second actuator portion 76 is out of contact with the second leaf spring 40 providing electrical continuity between the second fixed contact 34 and third fixed contact 44, that is, continuity is provided between voltage conductors 14, through conductor 50 to the flasher element 48, by conductor 52 from the flasher element to the third fixed contact 44, from the third fixed contact 44 through leaf spring 40 to the second fixed contact 34 which is connected to the supply conductor 18. Thus, in the FLASHER position, continuity is supplied between conductors 14 and 18 through the flasher element 48 which causes the bulb 10 of FIG. 1 to flash.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A switch which may be used such as for controlling a porch light for providing an emergency signal, the switch comprising:

a switch body of non-conductive material having an open top cavity therein;

a first fixed electrical contact member secured to said switch body within said cavity and having a first means for connecting a first electrical conductor thereto;

a second fixed electrical contact member secured to said switch body within said cavity and having second means to connect a second electrical conductor thereon;

a third fixed electrical contact member secured to said switch body within said cavity and having third means to connect a conductor thereto;

a first elongated leaf spring of electrical conductive material secured at one end thereof to said first fixed electrical contact member and having a contact point at the other end thereof, the contact point engaging said second fixed contact member when the first leaf spring is in its non-deflected position;

a second elongated leaf spring of electrical conductive material secured at one end thereof to said second fixed contact member and having at the other end thereof a contact point engaging said third fixed contact member when the second leaf spring is in its non-deflected position;

a flasher means secured to said switch body and having two electrical conductors extending therefrom, one of said conductors being connected to said first fixed contact member and the other conductor being connected to said third fixed contact member;

a toggle pivotally supported within said switch body having integral actuator post portions extending therefrom, the toggle being supportable in a first "OFF" position wherein said post portions deflect both said leaf springs whereby no continuity is provided through said switch between said first and second electrical contact members, and a second or "ON" position wherein said post portions permit said first leaf spring to return to its non-detected position providing continuity between said first and second fixed electrical contact members, and a third or "FLASHER" position wherein said posts deflect said first leaf spring but permit said second leaf spring to return to its non-deflected position providing continuity between said first and second fixed electrical contact members through said flasher means;

a toggle plate affixed to said switch body closing said cavity therein and pivotally receiving said member within said switch body cavity;

a position retention bar positioned within said switch body and in contact with said toggle; and spring bias means urging said position retention bar against said toggle and said toggle against said toggle plate to retain said toggle in position when said toggle plate is secured to said switch body.

* * * * *